(12) United States Patent
Stevanovic et al.

(10) Patent No.: US 7,262,981 B2
(45) Date of Patent: Aug. 28, 2007

(54) SYSTEM AND METHOD FOR REGULATING RESONANT INVERTERS

(75) Inventors: Ljubisa Dragoljub Stevanovic, Clifton Park, NY (US); Regan Andrew Zane, Superior, CO (US)

(73) Assignee: General Electric Company, Niskayuna, NY (US)

( * ) Notice: Subject to any disclaimer, the term of this patent is extended or adjusted under 35 U.S.C. 154(b) by 367 days.

(21) Appl. No.: 10/853,695

(22) Filed: May 25, 2004

(65) Prior Publication Data

US 2005/0265058 A1    Dec. 1, 2005

(51) Int. Cl.
*H02M 7/5387* (2006.01)
*H02M 3/24* (2006.01)
*H02H 7/122* (2006.01)

(52) U.S. Cl. ........................................ 363/132; 363/98
(58) Field of Classification Search ................. 363/16, 363/17, 56.01, 56.02, 97, 98, 131, 132; 315/194, 315/199, 209 R, 224, 225, 291, 299–301, 315/307, 308
See application file for complete search history.

(56) References Cited

U.S. PATENT DOCUMENTS

| | | | |
|---|---|---|---|
| 5,475,296 A * | 12/1995 | Vinsant et al. .............. 323/223 |
| 5,500,792 A | 3/1996 | Jeon et al. .................... 363/98 |
| 6,069,809 A | 5/2000 | Inoshita ........................ 363/98 |
| 6,100,647 A | 8/2000 | Giannopoulos et al. ..... 315/224 |
| 6,172,466 B1 | 1/2001 | Ki et al. ...................... 315/224 |
| 6,333,605 B1 * | 12/2001 | Grouev et al. .............. 315/291 |
| 6,509,699 B2 * | 1/2003 | Kim et al. ................... 315/291 |
| 6,538,393 B2 * | 3/2003 | Buij et al. ................... 315/224 |
| 6,646,898 B2 | 11/2003 | Furukawa et al. .......... 363/132 |
| 6,696,803 B2 | 2/2004 | Tao et al. .................... 315/291 |
| 6,917,531 B2 * | 7/2005 | Scheel et al. ................. 363/97 |
| 6,963,178 B1 * | 11/2005 | Lev et al. .................... 315/307 |
| 2002/0145886 A1 | 10/2002 | Stevens ........................ 363/16 |

* cited by examiner

*Primary Examiner*—Matthew V. Nguyen
(74) *Attorney, Agent, or Firm*—Fletcher Yoder

(57) ABSTRACT

A technique is provided for direct digital phase control of resonant inverters based on sensing of one or more parameters of the resonant inverter. The resonant inverter control system includes a switching circuit for applying power signals to the resonant inverter and a sensor for sensing one or more parameters of the resonant inverter. The one or more parameters are representative of a phase angle. The resonant inverter control system also includes a comparator for comparing the one or more parameters to a reference value and a digital controller for determining timing of the one or more parameters and for regulating operation of the switching circuit based upon the timing of the one or more parameters.

18 Claims, 3 Drawing Sheets

SYSTEM AND METHOD FOR REGULATING RESONANT INVERTERS

STATEMENT REGARDING FEDERALLY SPONSORED RESEARCH & DEVELOPMENT

This invention was made with Government support under contract number DE-FC26-02NT41252 awarded by U.S. Department of Energy. The Government has certain rights in the invention.

BACKGROUND

The invention relates generally to the field of digital phase controllers, and more specifically to the field of direct digital phase control for resonant inverters, such, as for providing power to a lamp assembly.

High frequency resonant inverters are used in a wide range of applications requiring high quality ac output, including electronic ballasts for lighting, induction-based heating appliances, medical equipment, and semiconductor processing equipment. In most applications, a closed-loop controller is required to regulate the output waveforms for improved rejection of component tolerances and variations in environmental conditions. Common approaches for regulating the output include control of the input dc bus, duty cycle, switching frequency, or triac cut-in angle.

Frequency control is one of the most popular control schemes due to its simplicity and wide dynamic range. However, direct frequency control results in a number of disadvantages, including high sensitivity near resonance, strong dependence on resonant tank component values, and a requirement for additional control circuitry to detect operation below resonance to prevent non-ZVS (zero-voltage-switching) conditions. Another alternative control method in electronic ballasts is to regulate the phase angle between mid-point voltage of a half-bridge inverter and the resonant inductor voltage or current. Phase control provides the advantages of self-tuning relative to the tank resonant frequency (insensitive to component variations), reduced sensitivity for improved control near resonance, and inherent protection against operation below resonance to avoid non-ZVS conditions.

Integrated circuit (IC) implementations of analog phase and frequency controllers have been known in the art to achieve the benefits of reduced external component count. In addition, a digital frequency controller for electronic ballasts has been developed, but does not include an approach for phase control with a direct digital interface to advanced controllers.

It is therefore desirable to provide for direct digital phase control of resonant inverters that achieves the benefits of temperature and semiconductor process independence, rapid design cycles, and real-time re-programmability in the controller operation.

BRIEF DESCRIPTION

Briefly, in accordance with one aspect of the technique, digital phase control for a resonant inverter is provided. The resonant inverter control system includes a switching circuit for applying power signals to the resonant inverter and a sensor for sensing one or more parameters of the resonant inverter. The one or more parameters are representative of a phase angle. The resonant inverter control system also includes a comparator for comparing the one or more parameters to a reference value and a digital controller for determining timing of the one or more parameters and for regulating operation of the switching circuit based upon the timing of the one or more parameters.

In accordance with another aspect of the technique, a method is provided for regulating a resonant inverter. The method provides for sensing one or more parameters of the resonant inverter, the one or more parameters being representative of a phase angle, comparing the one or more parameters to a reference value, determining timing of the one or more parameters, and regulating the resonant inverter via a switching circuit based upon the timing of the one or more parameters. Systems and computer programs that afford functionality of the type defined by this method may be provided by the present technique.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
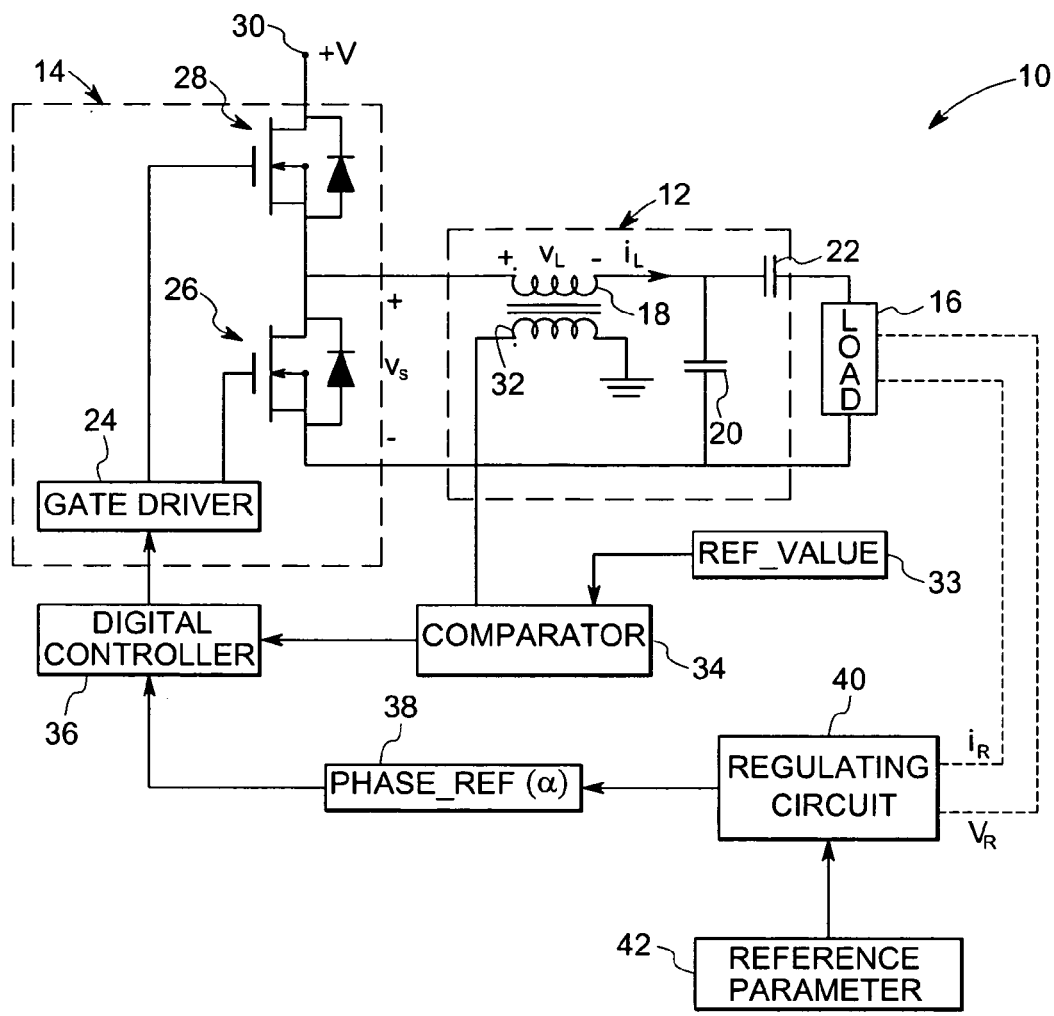
FIG. 1 is a schematic diagram of a direct phase control circuit in a resonant inverter based on inductor voltage sensing.

Referring now to FIG. 1, an exemplary resonant inverter system 10 includes a resonant tank 12, a switching circuit 14 and a load 16. In the illustrated figure, the resonant tank 12 is generally shown as an LCC resonant tank circuit comprising of a resonant inductor 18 and two discrete resonant capacitors 20 and 22. As would be appreciated by those skilled in the art, the resonant tank 12 may comprise of any alternative topologies. In this exemplary embodiment, a half bridge switching inverter circuit 14 is used, that converts the dc (direct current) voltage to a square-wave ac (alternating current) output. The half bridge switching inverter circuit further includes a gate driver 24, two discrete power MOSFETs 26 and 28. Alternatively, FETs, IGBTs, BJTs, or any other suitable switching devices may be used to design the half bridge switching inverter circuit 14. As would be appreciated by one skilled in the art other switching circuits can also be used without deviating from the scope of the invention.

The half bridge resonant inverter system 10 is generally of the voltage fed type belonging to a group of high frequency resonant inverters, which are particularly well suited to certain applications, such as to drive lamp circuits. A dc supply voltage (V) 30 is used to drive the resonant inverter system 10. The dc supply voltage 30 for the resonant inverter 10 may be obtained by rectifying ac input power via a four bridge rectifying diodes and smoothed by a buffer capacitor.

An EMI filter may be used to minimize the disturbance for feedback towards the power source (i.e. a power grid). Alternatively, a simple voltaic cell or other dc power source may be used to obtain the dc supply voltage 30.

When the resonant inverter system 10 is operated above resonance, the resonant inductor 18 dominates the resonant tank 12 such that the input impedance of the resonant inverter 10 is inductive, and the inductor current $i_L$ lags (and hence the inductor 18 voltage $v_L$ leads) the mid-point voltage $v_s$ from 0° to 90° as the switching frequency is increased above the resonance. The output power decreases as the phase angle varies from 0° to 90°. Thus, it is possible to control the output power by directly controlling the phase angle between the mid-point voltage $v_s$ and inductor voltage $v_L$ or inductor current $i_L$. The switching frequency is thus indirectly controlled through phase control.

By controlling the phase angle between the mid-point voltage $v_s$ and the inductor current $i_L$ to be greater than 0°, the resonant inverter system 10 will be forced to operate above resonance, resulting in inherent zero-voltage switching (ZVS) operation for appropriately designed resonant tanks 12. If the resonant frequency shifts due to variations of the resonant tank elements and load, the phase controller will self-tune to the resonant frequency and the operating point will not be affected. The resonant inverter 10 can achieve a high efficiency, due to the ZVS principle, thereby reducing the switching losses of the two power MOSFETs 26 and 28.

Phase control may be performed by sensing either the inductor current $i_L$ or inductor voltage $v_L$. Alternatively, the phase control may be performed by sensing either current $i_R$ or voltage $v_R$ of the load 16. FIG. 1 depicts a digital phase control implementation in a half bridge LCC resonant inverter 10 based on inductor voltage sensing. As will be appreciated by those skilled in the art, the implementation can be easily extended to other topologies. The primary advantage of inductor voltage $v_L$ sensing is the ability to use an additional winding 32 on the resonant inductor 18 as an inductor voltage sensor for low-cost, lossless sensing.

The inductor voltage $v_L$ from the inductor voltage sensor is then compared to a reference value 33 (ref_value) via a comparator 34. In one implementation the reference value 33 may be the ground potential to detect the zero-crossing of the inductor voltage $v_L$. A digital controller 36 times the period by detecting the inductor voltage zero-crossing and then computes the required time delays from the zero-crossing to achieve the desired phase and duty cycle of the resonant inverter 10 based on a digital phase command 38 (phase_ref). Any type of digital controller 36 such as FPGA-based digital controller, microprocessor, microcontroller, ASIC digital controller or DSP based digital controller may be used for this purpose. The digital controller 36 regulates the resonant inverter 10 via the gate driver 24 of the switching circuit 14. The digital phase command 38, representative of a desired phase angle, may be fixed or dynamically controlled via a regulating circuit 40. In one implementation the regulating circuit 40 regulates the load power by setting the required digital phase command 38 based on the current $i_R$ and voltage $v_R$ feedback from the load 16 and a reference parameter 42. Alternatively, the regulating circuit 40 may regulate the load current $i_R$, the load voltage $v_R$, and/or other system parameters based on a feedback loop and the reference parameter 42.

Figure 2:
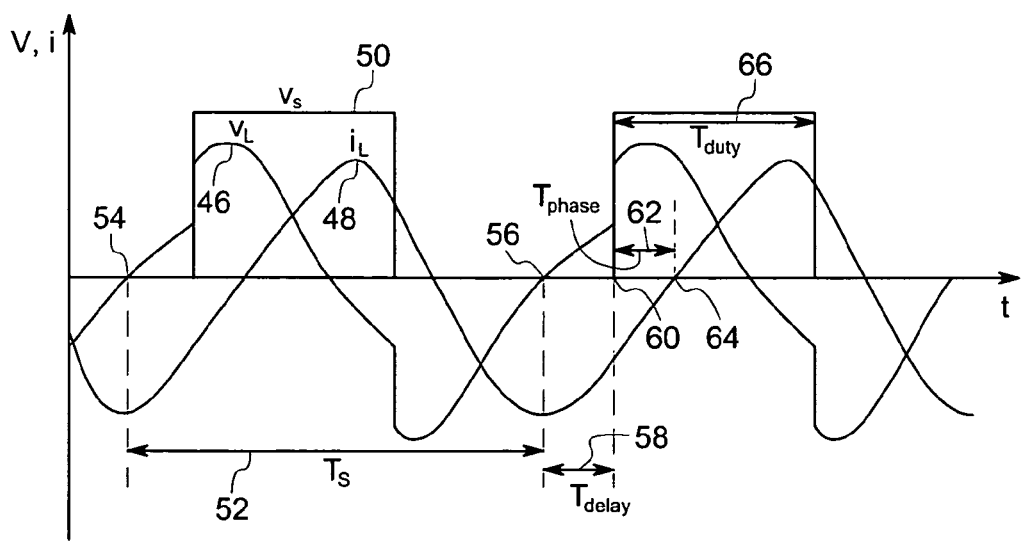
FIG. 2 is a diagrammatical view of inductor voltage and inductor current waveforms along with mid-point voltage waveform in a resonant inverter.

FIG. 2 depicts the inductor voltage $v_L$ and the inductor current $i_L$ waveforms indicated generally by the reference numeral 46 and 48 respectively along with the mid-point voltage $v_s$ waveform indicated generally by reference numeral 50 for the closed-loop resonant inverter system 10 described in FIG. 1. Referring to FIG. 2 switching time $T_S$, indicated generally by reference numeral 52, is defined as time interval between rising edges of two successive inductor voltage zero-crossings such as those indicated by reference numeral 54 and 56. In addition, delay time $T_{delay}$, indicated generally by reference numeral 58, is the time interval between rising edge of the inductor voltage zero-crossing and rising edge of the mid-point voltage $v_s$ such as those indicated by reference numeral 56 and 60 while phase time $T_{phase}$, indicated generally by reference numeral 62, is the time interval between rising edge of the mid-point voltage $v_s$ and rising edge of the inductor current zero-crossing such as those indicated by reference numeral 60 and 64.

As inductor voltage $v_L$ leads mid-point voltage $v_s$, the zero-crossing of inductor voltage $v_L$ is detected to determine when to turn on or off the high and low side gate to achieve the desired phase. The control equations can be derived from FIG. 2, where, assuming the inductor current $i_L$ lags the inductor voltage $v_L$ by 90° (which is generally true for sinusoidal signals), delay time, phase time and switching time is in accordance with the relationship:

$$T_{delay} + T_{phase} = T_s/4 \quad (1)$$

For a given digital phase command 38, phase_ref, in degrees, the delay time $T_{delay}$ is calculated as follows:

$$T_{delay} = T_s/4 - \text{phase\_ref} \times T_s/360° \quad (2)$$

Since the inductor current phase can only vary from 0° to 90°, equation (2) can be expressed more explicitly as:

$$T_{delay} = T_s/4(1-\alpha) \quad (3)$$

where $\alpha$=phase_ref/90°. For a given switching time $T_S$ and the phase command, equation (3) can be used to compute $T_{delay}$. Because mid-point voltage $v_s$ is in phase with the high-side gate-drive signal, $T_{delay}$ can also be considered as the delay between the zero-crossing of the inductor voltage $v_L$ and the high-side gate-drive signal (ignoring the delay of the gate driver). The high-side gate on-time, $T_{duty}$, indicated generally by reference numeral 66 can be determined based on $T_S$ and desired duty cycle D as:

$$T_{duty} = DT_s \quad (4)$$

Figure 3:
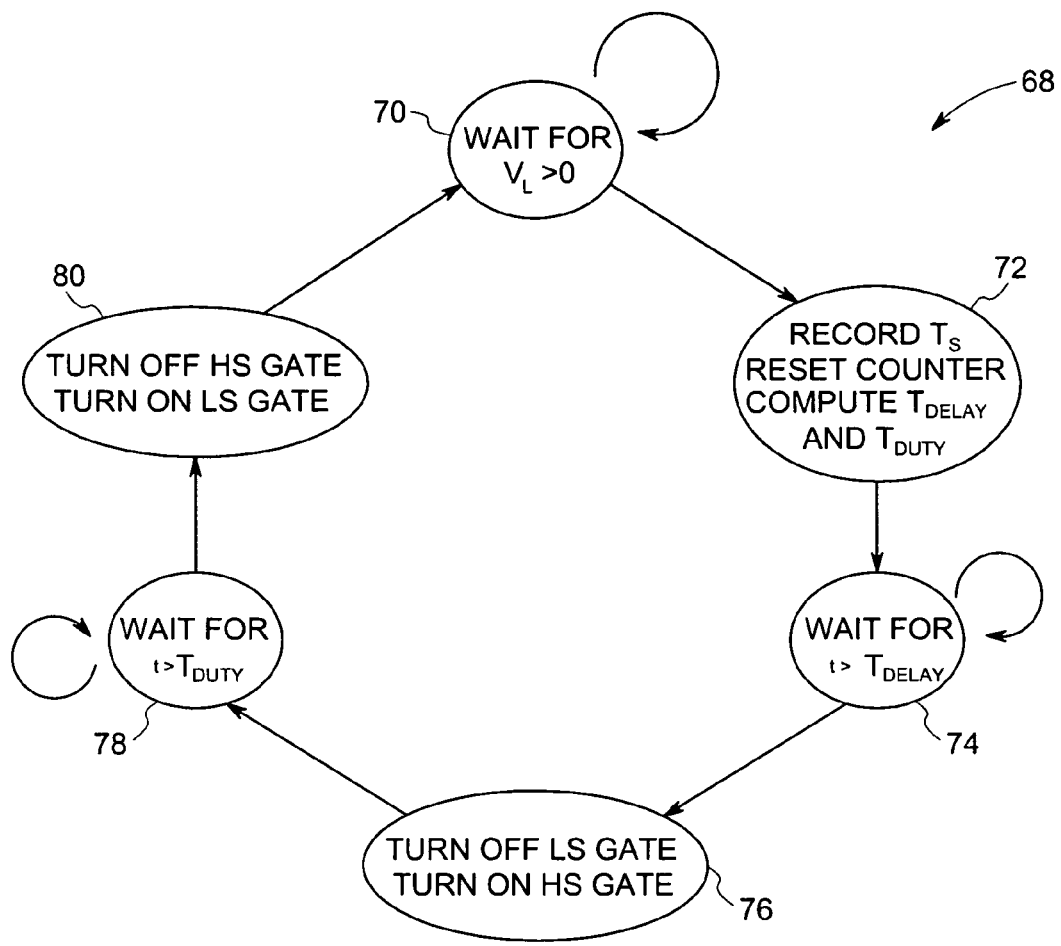
FIG. 3 is a state machine diagram of the digital phase control scheme based on inductor voltage sensing.

Hence a control scheme 68 based on the inductor voltage sensing is represented using a state machine as shown in FIG. 3. The control scheme 68 includes the steps of detecting the zero-crossing of the inductor voltage $v_L$ using a high-speed comparator at step 70; recording switching time, $T_S$, of the previous cycle resetting counter and computing $T_{delay}$ and $T_{duty}$ according to equation (3) and equation (4) at step 72; waiting for $T_{delay}$ at step 74 to turn off low-side (LS) gate and turn on high-side (HS) gate of the switching circuit 14 via the gate driver 24 with a proper deadtime at step 76; and waiting for $T_{duty}$ at step 78 to turn off HS gate and turn on LS gate of the switching circuit 14 via the gate driver 24 with a proper deadtime at step 80. The complete cycle is repeated after waiting for the next zero-crossing of the inductor voltage. The control scheme 68 achieves substantially accurate phase control for duty cycles near 50%. As the duty cycle deviates from 50%, an error is created resulting in a difference between the digital phase command 38 and the actual phase of the fundamental components of the inductor current $i_L$ and midpoint voltage $v_s$. This is due to the way $T_{phase}$ 62 is referenced to the rising edge of the midpoint voltage $v_s$. The error is negligible for operation near 50% duty cycle. The control scheme 68 may be extended to compensate for the phase error at all duty cycles by adjusting $T_{phase}$ 62 to reference to the fundamental component of the midpoint voltage $v_s$ at the cost of additional computational complexity.

As it would be appreciated by those skilled in the art, the control scheme 68 can be implemented using a digital controller 36. For digital control, equation (3) and equation (4) are revised as $$T_{delay}[n] = \frac{T_s[n-1]}{4}(1 - \alpha[n]) \quad (5)$$

$$T_{duty}[n] = DT_s[n-1] \quad (6)$$

where $\alpha[n]$=phase_ref[n]/90°. As $0 \leq \alpha[n] \leq 1$, to facilitate digital implementation, equation (5) can be further revised as $$T_{delay}[n] = \frac{T_s[n-1]}{4} \frac{(2^m - 1) - \alpha_1[n]}{2^m} \quad (7)$$

where $0 \leq \alpha_1[n] \leq 2^m-1$, m is the number of bits in the digital phase command 38, and $\alpha_1[n]$=0 corresponds to 0° while $\alpha_1[n]$=$2^m-1$ corresponds to 90°. Similarly, equation (6) can also be revised as $$T_{duty}[n] = D_1/2^k T_s[n-1] \quad (8)$$

where $0 \leq D_1 \leq 2^k-1$, k is the bits of digital duty cycle. In one implementation, both the phase command $\alpha_1[n]$ and the duty-cycle $D_1$ are 8-bits, which means that value of m and k in equation (7) and equation (8) is equal to 8. For example, in the above implementation, $\alpha_1[n]$=10000000 corresponds to 45° and $\alpha_1[n]$=00011111 corresponds to 10.9°.

Figure 4:
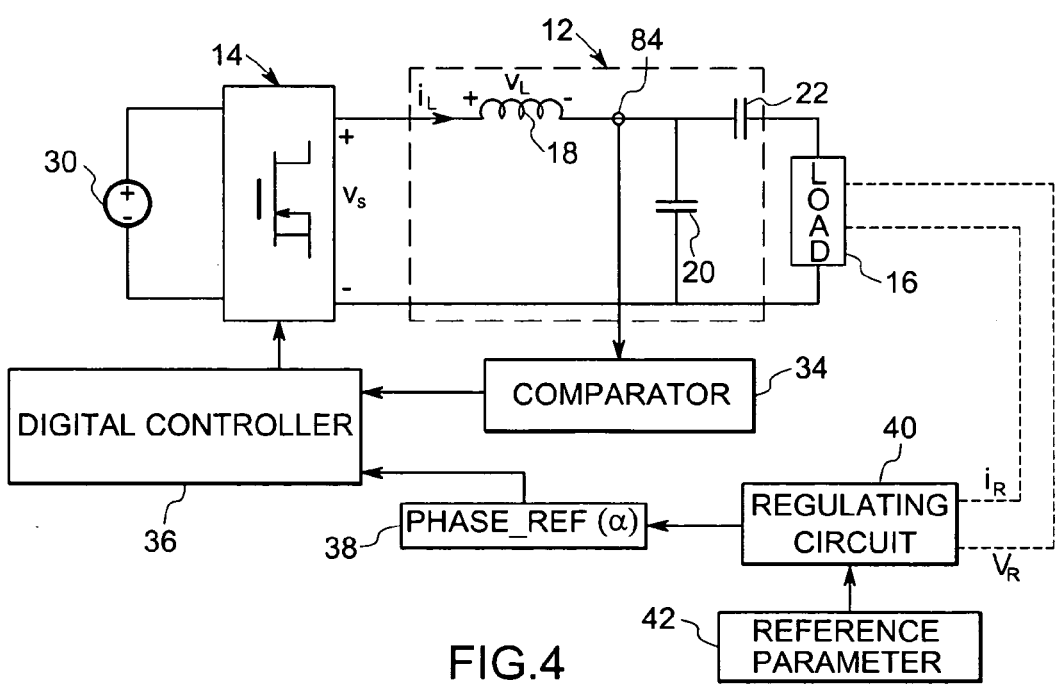
FIG. 4 is a schematic diagram of a direct phase control circuit in a resonant inverter based on inductor current sensing.

The configuration for a half-bridge LCC resonant inverter 82 with digital phase control through inductor current sensing is shown in FIG. 4, and can be easily extended to other topologies. The inductor current sensing approach is similar to the inductor voltage sensing approach described above. The approach based on inductor current sensing requires additional current sensing means 84 such as a current transformer (CT) instead of an additional winding on the resonant inductor for voltage sensing. As the inductor current $i_L$ is nearly sinusoidal, the digital phase control in a half bridge LCC resonant inverter 82 based on inductor current sensing offers better accuracy, especially if the inductor voltage $v_L$ is distorted. A dc supply 30 is used to drive the resonant inverter system 82 comprising of a resonant tank 12, a switching circuit 14 and a load 16. The digital controller 36 times the period by detecting the inductor current zero-crossing via an inductor current sensor 84 and a comparator 34, and then computes the required time delays from the zero-crossing based on the digital phase command 38 to determine when to turn on or off the high and low-side gates of the switching circuit 14 to achieve the desired phase. As described above, the digital phase command 38, representative of a desired phase angle, may be fixed or dynamically controlled via a regulating circuit 40. In addition, the regulating circuit 40 regulate system parameters such as load power, the load current $i_R$, and/or the load voltage $v_R$ by setting the required digital phase command 38 based on the current $i_R$ and/or voltage $v_R$ feedback from the load 16 and a reference parameter 42.

Figure 5:
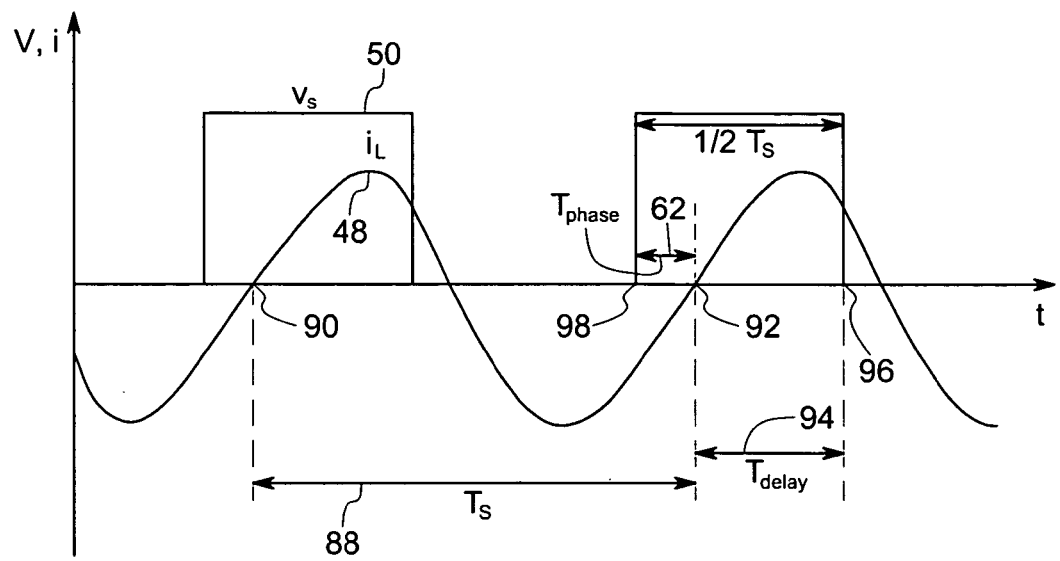
FIG. 5 is a diagrammatical view of inductor current waveform along with mid-point voltage waveform in a resonant inverter.

FIG. 5 depicts the inductor current $i_L$ waveforms indicated generally by the reference numeral 48 along with the midpoint voltage $v_s$ waveform indicated generally by the reference numeral 50 for the closed-loop resonant inverter system 82 described in FIG. 4. Referring to FIG. 5 switching time $T_S$, indicated generally by reference numeral 88, is defined as time interval between rising edges of two successive inductor current zero-crossings such as those indicated by reference numeral 90 and 92. Delay time $T_{delay}$, indicated generally by reference numeral 94, is the time interval between rising edge of the inductor current zero-crossing and falling edge of the mid-point voltage $v_s$ such as those indicated by reference numeral 92 and 96 while phase time $T_{phase}$, indicated generally by reference numeral 62, is the time interval between rising edge of the mid-point voltage $v_s$ and rising edge of the inductor current zero-crossing such as those indicated by reference numeral 98 and 92.

The control equations for current sensing approach can be derived from FIG. 5 in a similar way to that of voltage sensing. As shown in FIG. 5, $$T_{delay} + T_{phase} = T_s/2 \quad (9)$$

where $T_{phase}$ is the time-representation of inductor current phase and $T_{delay}$ is the control variable. For a given digital phase command 38, phase_ref, in degrees referred to the inductor current phase, the delay time $T_{delay}$ is calculated as follows:

$$T_{delay} = T_s/2 - \text{phase\_ref} \times T_s/360° \quad (10)$$

Since the inductor current phase can vary only from 0° to 90°, equation (10) can be expressed more explicitly as $$T_{delay} = T_s/4(2-\alpha) \quad (11)$$

where $\alpha$=phase_ref/90°. For a given switching time, $T_S$ and the phase command, equation (11) can be used to compute $T_{delay}$.

Figure 6:
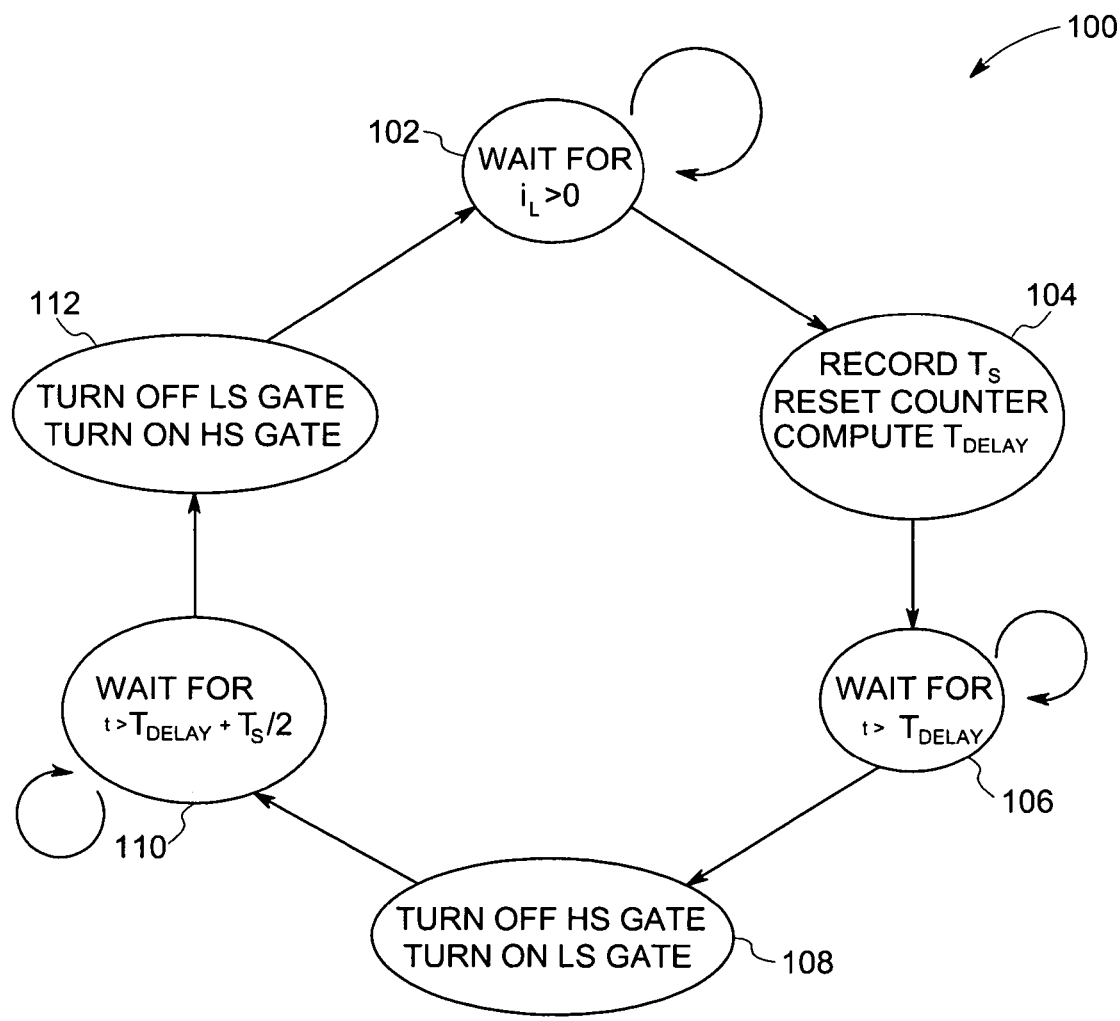
FIG. 6 is a state machine diagram of the digital phase control scheme based on inductor current sensing.

Hence a control scheme 100 based on the inductor current sensing is represented using a state machine as shown in FIG. 6. The control scheme 100 includes the steps of detecting the zero-crossing of the inductor current $i_L$ using a high-speed comparator at step 102; recording switching time $T_S$ of the previous cycle resetting counter and computing $T_{delay}$ according to equation (11) at step 104; waiting for $T_{delay}$ at step 106, to turn off high-side (HS) gate and turn on low-side (LS) gate of the switching circuit 14 with a proper deadtime at step 108; and waiting for half of $T_S$ at step 110, to turn on the HS gate and turn off the LS gate of the switching circuit 14 with a proper deadtime at step 112. The complete cycle is repeated after waiting for the next zero-crossing of the inductor current $i_L$. The control scheme 100 achieves substantially accurate phase control at a duty cycle of about 50%. As described above, the control scheme 100 may be further extended to operate at all duty cycles by adjusting $T_{phase}$ 62 to reference to the fundamental component of the midpoint voltage $v_s$ at the cost of additional computational complexity.

As will be appreciated by those skilled in the art, the control scheme 100 can be implemented using a digital controller 36. For digital control, equation (11) is revised as:

$$T_{delay}[n] = \frac{T_s[n-1]}{4}(2 - \alpha[n]) \quad (12)$$

where α[n]=phase_ref[n]/90°. As 0≦α[n]≦1, to facilitate digital implementation, equation (12) can be further revised as:

$$T_{delay}[n] = \frac{T_s[n-1]}{4} \frac{(2^m - 1) + (2^m - 1 - \alpha_1[n])}{2^m} \quad (13)$$

where $0 \leq \alpha_1[n] \leq 2^m-1$, m is the number of bits in the digital phase command, and $\alpha_1[n]=0$ corresponds to 0° while $\alpha_1[n]=2^m-1$ corresponds to 90°. In one implementation, the digital phase command $\alpha_1[n]$ is 8-bits, which means that value of m in equation (13) is equal to 8.

Equation (7) and equation (8) are the control equations for the digital phase control scheme via voltage sensing while equation (13) is the control equation for the digital phase control scheme via current sensing. From the above equations, it may be noted that the switching period of the previous cycle is used for the delay computation of the present cycle.

A small error exists in equation (7) and equation (13) due to a denominator of $2^m$ instead of $2^m-1$, that requires significantly more gates to implement in hardware. For large m, this error becomes insignificant and can be ignored. Additional corrections for cancellation of the gate driver delay may be implemented to improve the performance. The gate driver delay is reduced by improving zero-crossing detection circuitry and by measuring and actively canceling cycle-by-cycle gate driver delay. For example, active cancellation of the delay error of the gate driver (~100 ns) can be achieved by sensing the delay between the gate command and resulting gate drive signal, and modifying equation (13) as $$T_{delay}[n] = \frac{T_s[n-1]}{4} \frac{(2^m - 1) + (2^m - 1 - \alpha_1[n])}{2^m} - T_{gd}[n-1] \quad (14)$$

where $T_{gd}$ is the gate driver delay obtained by feeding the LS gate drive signal back to the digital controller.

The control equations (7), (8) and (13) can be easily realized using standard digital logic and implemented in a custom CMOS digital control IC or programmable logic. It can also be implemented in a microcontroller or a DSP. In one implementation the platform is based on the Insight/Memec development board for the Xilinx Virtex II FPGA commercially available from Xilinx Inc., which provides rapid prototyping of the proposed digital control concepts with realistic hardware-based realization.

A counter is used to record the period and control the timing, where the minimum time step is determined by the system clock frequency. In one implementation, a 100 MHz clock frequency is used, which may be increased to 200 MHz internally. Based on the resonant inverter operating frequency of approximately 100 kHz, and the clock frequency of 100 MHz, time resolution of 10 ns is achieved. In another implementation, time resolution down to 1 ns can be achieved using internal flip-flop based ring-oscillator structures. The complete digital circuit can be described using any hardware description language (HDL) such as Verilog HDL (VHDL), thereby making synthesis to gate-level schematics and hardware realization fully automated.

Direct digital phase control approach in resonant inverters as described in the various embodiments discussed above, provides the benefits of self-tuning to the resonant frequency, insensitivity to IC process, component and temperature variations, and the digital benefits of rapid prototyping and real-time re-programmability. By regulating the inductor voltage or current phase angle, the switching frequency and hence the operating point or the output power is controlled.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A resonant inverter control system comprising:
    a switching circuit for applying power signals to a resonant inverter;
    a sensor for sensing one or more parameters of the resonant inverter, the one or more parameters being representative of a phase angle;
    a comparator for comparing the one or more parameters to a reference value;
    a digital controller for determining timing of the one or more parameters based upon the comparison and a digital phase command and for regulating operation of the switching circuit based upon the timing of the one or more parameters, the digital phase command being representative of a desired phase angle.

2. The resonant inverter control system of claim 1, wherein the one or more parameters comprise at least one of inductor voltage, inductor current, load voltage, and load current.

3. The resonant inverter control system of claim 1, wherein the sensor comprises at least one of a current sensor and a voltage sensor.

4. The resonant inverter control system of claim 1, wherein the reference value is a ground value.

5. The resonant inverter control system of claim 1, further comprising a regulating circuit adapted to provide the digital phase command based on at least one of load voltage, load current, and a reference parameter.

6. The resonant inverter control system of claim 1, wherein the digital phase command is in a range of 0 degree to 90 degrees.

7. The resonant inverter control system of claim 1, wherein the timing of the one or more parameters comprises at least one of switching time, delay time, and duty time.

8. The resonant inverter control system of claim 7, wherein the switching time is the time between two consecutive rising edges at zero-crossings of the one or more parameters.

9. The resonant inverter control system of claim 7, wherein the delay time and the duty time are dependent on the switching time.

10. The resonant inverter control system of claim 1, wherein the comparator and the digital controller is selected based upon control speed.

11. A method for regulating a resonant inverter, the method comprising:
    sensing one or more parameters of the resonant inverter, the one or more parameters being representative of a phase angle;
    comparing the one or more parameters to a reference value;
    determining timing of the one or more parameters based upon the comparison and a digital phase command, the digital phase command being representative of a desired phase angle; and regulating the resonant inverter via a switching circuit based upon the timing of the one or more parameters.

12. The method of claim 11, wherein the one or more parameters comprises at least one of inductor voltage, inductor current, load voltage, and load current.

13. The method of claim 11, wherein the timing of the one or more parameters comprises at least one of switching time, delay time, and duty time.

14. A tangible, machine readable media, comprising:
code adapted to sense one or more parameters of a resonant inverter, the one or more parameters being representative of a phase angle;
code adapted to compare the one or more parameters to a reference value;
code adapted to determine timing of the one or more parameters based upon the comparison and a digital phase command, the digital phase command being representative of a desired phase angle; and
code adapted to regulate the resonant inverter via a switching circuit based upon the timing of the one or more parameters.

15. The tangible, machine readable media of claim 14, further comprising code adapted to provide the digital phase command based on at least one of load voltage, load current, and a reference parameter.

16. The resonant inverter control system of claim 1, wherein the digital phase command is fixed or dynamically controlled.

17. The method of claim 11, further comprising providing the digital phase command based on at least one of load voltage, load current, and a reference parameter.

18. The method of claim 11, wherein the digital phase command is fixed or dynamically controlled.

* * * * *